United States Patent Office.

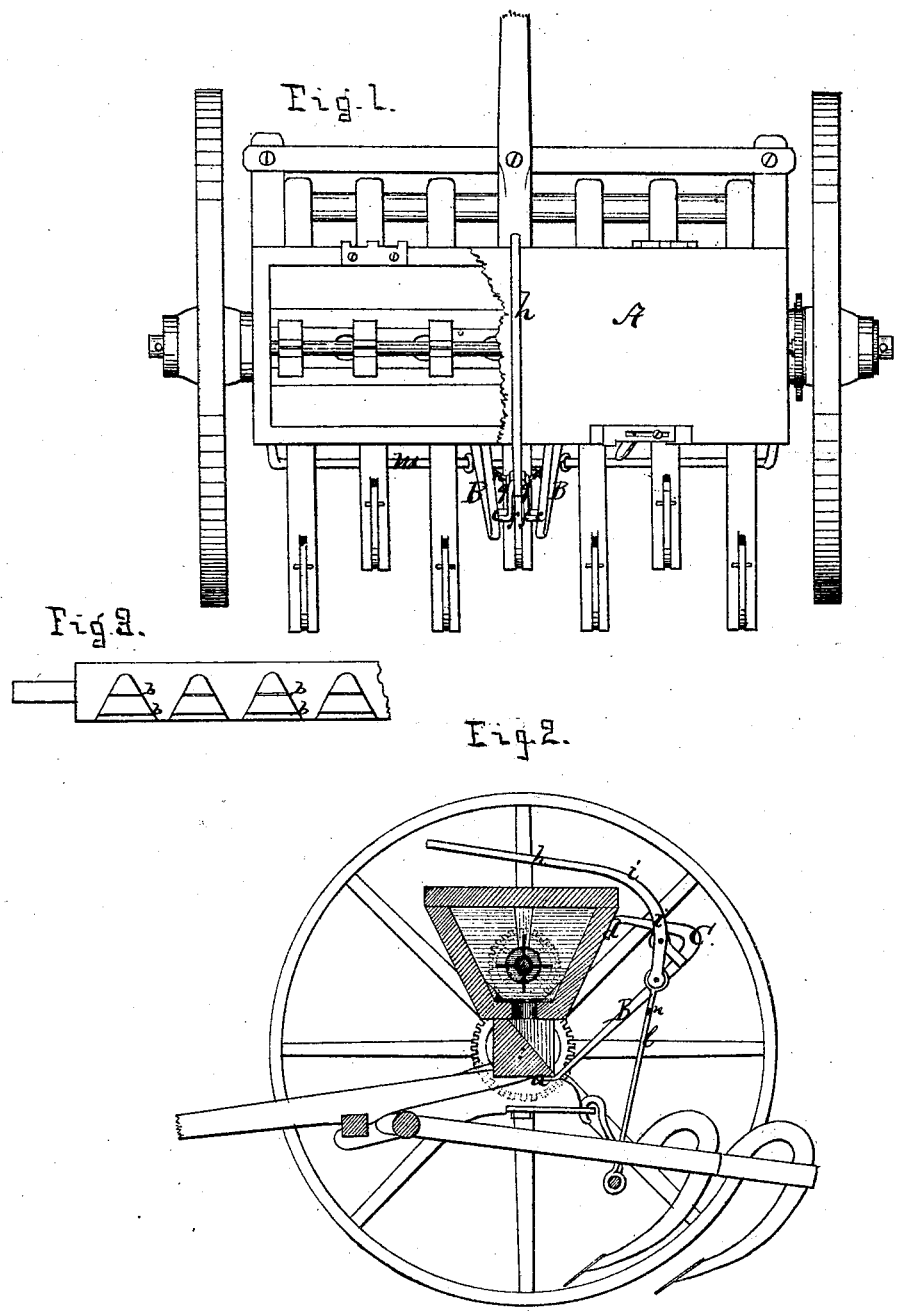

JAMES T. MOTT, OF POSTVILLE, IOWA.

Letters Patent No. 111,372, dated January 31, 1871.

IMPROVEMENT IN SEEDERS AND CULTIVATORS.

The Schedule referred to in these Letters Patent and making part of the same.

*To all whom it may concern:*

Be it known that I, JAMES T. MOTT, of Postville, in the county of Allamakee and State of Iowa, have invented new and useful Improvements in Broadcast Seeders and Cultivators; and I do hereby declare that the following is a full, clear, and exact description of the same, which will enable others skilled in the art to construct and use the same, reference being had to the accompanying drawing forming part of this specification, in which—

Figure 1 represents a plan view of my improved seeder, with the top of the hopper broken away to show its interior;

Figure 2, a transverse sectional elevation; and

Figure 3, a plan view of the scattering devices upon the axle.

This invention relates to a new device for scattering the seed broadcast, which is cheaply, simply, and durably made.

It consists of an ordinary axle, with triangular shaped channels or chutes, and fitted with narrow pieces of thin iron, set horizontally in them for the seed to pass over in its descent.

The invention also consists in a new device for easily raising and lowering the cultivator-teeth while the operator is either riding on the machine or walking behind it.

This result is accomplished by means of a lever, which is constructed in a peculiar manner, and connected to an iron frame, with rods connecting the short arm of the lever to the lift-rod of the cultivator.

The said frame is constructed in such a way that the center or fulcrum, about which the short arm of the lever turns, is forward of and between the outer portion of the frame and the seed-box, allowing said rods, that connect with the short arm of the lever and the lift-rod, as the lever is drawn back to raise the cultivator, to pass by on each side of said fulcrum, and a little back of a line of center to a point where they fit against certain shoulders, the weight of the cultivator preventing its return, thus avoiding the necessity of any fixed fastenings.

To enable others skilled in the art to which my invention appertains to make and use the same, I will now proceed to describe fully its construction and method of operation.

A represents an ordinary broadcast seeder and cultivator with my improvement attached. They may be attached to any of the usual forms known.

The one I adopt, however, is a common seed-box, of any desired length, with two iron slides in its bottom, with coresponding inch-holes, seven inches apart, and a cultivator with each tooth independent of the others, the arms of which being hung on a rod in front of the seed-box, with a lift-rod hung on a hinge beneath them.

In making the improvement for scattering the seed, I use a three-and-a-half inch-square axle, cutting in it triangular-shaped channels or chutes, seven inches apart, directly under each hole in the bottom of the seed-box, with square corners and flat surface, making, when completed, an inclined plane of a little less than forty-five degrees, across each of which are fitted thin narrow strips of iron, substantially as shown in fig. 3, at $b\ b$, for the purpose of scattering the seed uniformly as it passes down the chutes.

I construct my improvement for raising and lowering the cultivator, of iron in two corresponding parts, a right-hand and a left-hand portion, as shown in fig. 1 at B B.

These parts are of sufficient length to be fastened to the lower side of the axle at $a\ a$, running up behind the seed-box to an equal height, and eight inches from it, at which point, as shown in fig. 2 at C, they are bent and attached firmly to the seed-box at $d$. They are four inches apart at the top and seven at the bottom, and have irons projecting in toward each other, as shown at $e\ e$ in fig. 1, one inch, to $f\ f$, then a square shoulder one and a half inch, to $g\ g$.

To these I fasten a peculiar shaped lever, $h$, as shown in fig. 2, securely, with a pin, which forms a fulcrum, about which the short arm of the lever turns, making a little more than a half circle in raising or lowering the cultivator, as shown in fig. 2 at $i\ i$.

At the end of the short arm, which is about six inches in length, are attached two rods $l\ l$, connecting it to the lifting-bar $m$, that raises the cultivator, said rods being bent at $n\ n$, so that, as the cultivator is raised, they will pass by the center or fulcrum on each side until they rest against the shoulders at $f\ f$, where they are held by the weight of the cultivator, thereby avoiding the necessity of any fixed fastenings.

Having thus fully described my invention—

What I claim as new, and desire to secure by Letters Patent, is—

1. The axle, constructed as described, and provided with the strips $b\ b$, for the purpose set forth.

2. The arrangement of the standards B B, with parts $e\ e\ f\ f$, lever $h$, rods $l\ l$, bent at $n\ n$, and bar $m$ of the cultivator, all operating as set forth.

JAMES T. MOTT.

Witnesses:
T. C. RANSOM,
T. STILES.